(12) United States Patent
Ritter

(10) Patent No.: US 11,399,082 B1
(45) Date of Patent: Jul. 26, 2022

(54) COLLABORATIVE MESSAGE BROKER SCALING AND MIGRATION

(71) Applicant: SAP SE, Walldorf (DE)

(72) Inventor: Daniel Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/211,038

(22) Filed: Mar. 24, 2021

(51) Int. Cl.
| | |
|---|---|
| *G06F 15/16* | (2006.01) |
| *H04L 67/562* | (2022.01) |
| *H04L 9/40* | (2022.01) |
| *H04L 67/101* | (2022.01) |
| *H04L 67/148* | (2022.01) |
| *H04L 67/568* | (2022.01) |

(52) U.S. Cl.
CPC .......... *H04L 67/562* (2022.05); *H04L 63/102* (2013.01); *H04L 67/101* (2013.01); *H04L 67/148* (2013.01); *H04L 67/568* (2022.05)

(58) Field of Classification Search
CPC . H04L 67/101; H04L 67/148; H04L 67/2809; H04L 67/2842; H04L 67/562; H04L 67/568; H04L 63/102
USPC .................................. 709/202–203; 718/105
See application file for complete search history.

(56) References Cited

U.S. PATENT DOCUMENTS

| | | | | |
|---|---|---|---|---|
| 7,111,063 | B1* | 9/2006 | Clark .................. | H04L 67/1023 718/105 |
| 8,880,621 | B2* | 11/2014 | Jonnagadla ........... | G06F 9/5055 709/206 |
| 9,009,683 | B2* | 4/2015 | Siddalingesh ...... | G06F 11/3672 717/135 |
| 10,560,404 | B2* | 2/2020 | Menchaca ............. | H04L 67/141 |
| 11,126,483 | B1* | 9/2021 | Das ......................... | H04L 51/30 |
| 2004/0225893 | A1* | 11/2004 | Ng ....................... | G06F 21/6227 726/27 |
| 2013/0007505 | A1* | 1/2013 | Spear .................. | G06F 11/2025 714/4.11 |
| 2013/0060834 | A1* | 3/2013 | Paramasivam ......... | H04L 12/66 709/202 |
| 2017/0373860 | A1* | 12/2017 | Kshirsagar .......... | H04L 63/0823 |
| 2020/0396306 | A1* | 12/2020 | Jaltade ................ | H04L 67/2809 |

* cited by examiner

*Primary Examiner* — Bharat Barot
(74) *Attorney, Agent, or Firm* — Buckley, Maschoff & Talwalkar LLC

(57) ABSTRACT

A client node may execute an application that communicates with a first messaging service component of a first broker node in a server segment and a second messaging service component of a second broker node in the server segment. A load balancing component is coupled to the client node, and a first virtual provider entity for the first messaging service component is coupled to the load balancing component. The first virtual provider entity may represent a first HA message broker pair, including: (i) a first leader message broker entity, and (ii) a first follower message broker entity to take control when there is a problem with the first leader message broker entity. A shared database is accessible by the first broker node, the first HA message broker pair, and the second broker node, and includes an administration registry data store.

16 Claims, 17 Drawing Sheets

US 11,399,082 B1

COLLABORATIVE MESSAGE BROKER SCALING AND MIGRATION

BACKGROUND

An enterprise, such as a business, may use a messaging system (e.g., a stateful messaging system) at the center of an Information Technology ("IT") infrastructure (such as a cloud-based or on-premises infrastructure. As used herein, the phrase "messaging system" may refer to, for example, an Enterprise Messaging System ("EMS") or protocol that lets organizations to send semantically precise messages between computer systems. A messaging system may promote a loosely coupled architectures that are facilitated by the use of structured messages (such as Extendible Mark-up Language ("XML") or JavaScript Object Notation ("JSON")) and appropriate protocols (such as Data Distribution Service ("DDS"), Microsoft Message Queuing ("MSMQ"), Advanced Message Queuing Protocol ("AMQP") or Simple Object Access Protocol ("SOAP") with web services).

In many cases, a messaging system may be associated with mission-critical, asynchronous message buffers, stream and event processing engines, connectivity, etc. and use message brokers provide important service qualities that are required for delivery guarantees (such as an "exactly once, in order" guarantee). As a result, the messaging system needs to always be available (e.g., a High Availability ("HA")) system that utilizes disaster recovery) even when handling heavy message loads, substantial message sizes, and increasing message rates. Besides "vertical" scaling (adding more resources to a messaging systems host machine), which usually cannot be maintained beyond a certain load, "horizontal" scaling across multiple cloud resources may be able to support increasing workloads.

There are several problems with current approaches to messaging systems, including scalability, availability, and migration. For horizontal scaling or load balancing, coordination between brokers is required. That is usually done through a so-called HA "broker network" which essentially is a point-to-point coordination between all (n*(n−1))/2 pairs of brokers. However, the overhead of such a mechanism is costly in terms of performance. Even worse, in practice the coordination in such a broker network often negatively impacts the stability and availability of a messaging system (e.g., because the nodes are busy coordinating the requests between the different brokers of the messaging system). Moreover, existing (or "legacy") single broker messaging systems may need a migration path to a scalable solution that does not cause significant downtime and that can be reconfigured during runtime.

It would therefore be desirable to provide collaborative message broker scaling and migration in a secure, automatic, and efficient manner.

SUMMARY

According to some embodiments, methods and systems may provide load balancing for an HA messaging system in a multi-tenant High Availability ("HA") computing environment. A client node may execute an application that communicates with a first messaging service component of a first broker node in a server segment and a second messaging service component of a second broker node in the server segment. A load balancing component is coupled to the client node, and a first virtual provider entity for the first messaging service component is coupled to the load balancing component. The first virtual provider entity may represent a first HA message broker pair, including: (i) a first leader message broker entity, and (ii) a first follower message broker entity to take control when there is a problem with the first leader message broker entity. A shared database is accessible by the first broker node, the first HA message broker pair, and the second broker node, and includes an administration registry data store.

Some embodiments comprise: means for executing, by a client node in an application segment, an application that communicates with a first messaging service component of a first broker node in a server segment and a second messaging service component of a second broker node in the server segment; means for providing a load balancing component in the server segment and coupled to the client node; means for representing, by a first virtual provider entity for the first messaging service component, a HA first message broker pair, the first pair including: (i) a first leader message broker entity, and (ii) a first follower message broker entity to take control when there is a problem with the first leader message broker entity; and means for accessing, by the first broker node, the HA first message broker pair, and the second broker node, a shared database, the shared database including an administration registry data store.

Some technical advantages of some embodiments disclosed herein are improved systems and methods to provide collaborative message broker scaling and migration in a secure, automatic, and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
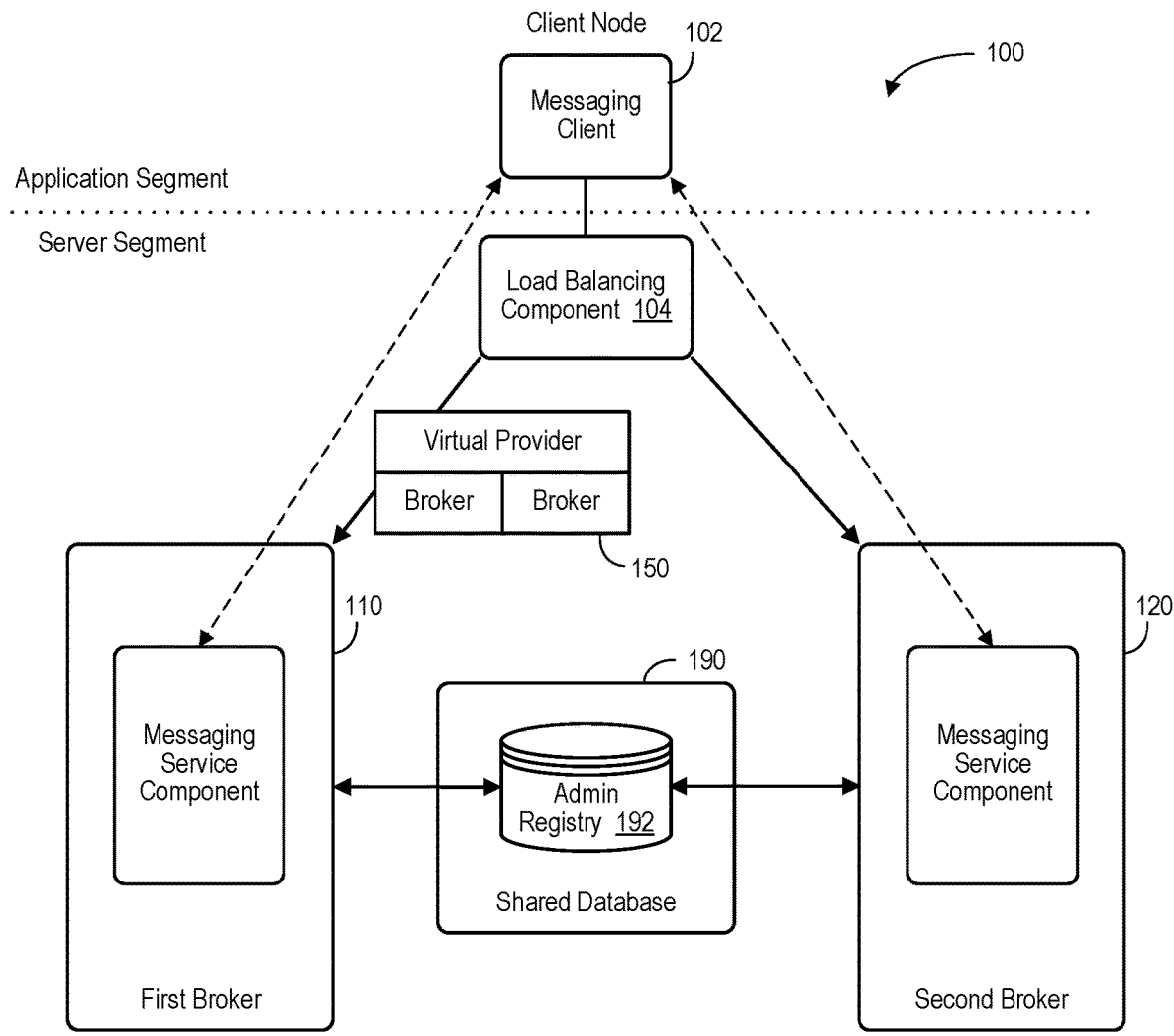
FIG. 1 is a high-level block diagram of a system in accordance with some embodiments.

FIG. 1 is a high-level block diagram of a system 100 in accordance with some embodiments. The system 100 may, for example, provide load balancing for an HA messaging system in a multi-tenant HA computing environment. A client node 102 in an application segment may execute an application (e.g., a messaging client) that communicates with a first messaging service component of a first broker node 110 and a second messaging service component of a second broker node 120 in a server segment. A load balancing component 104 is coupled to the client node 102, and a first virtual provider entity 150 for the first messaging service component is coupled to the load balancing component 104. The first virtual provider entity 150 may represent a first HA message broker pair, including: (i) a first leader message broker entity, and (ii) a first follower message broker entity to take control when there is a problem with the first leader message broker entity. A shared database 190 is accessible by the first broker node 110, the first HA message broker pair, and the second broker node 120, and includes an administration registry data store 192. Various actions of the system 100 may performed automatically or be initiated via a command from a remote operator interface device. As used herein, the term "automatically" may refer to, for example, actions that can be performed with little or no human intervention. Note that the elements of the system 100 may be associated with one or more libraries, a cloud or on-premises operating environment, software engines and similar components to execute various functions, etc. These components may be associated with an environment in which any of the software described herein is executed and may include hardware elements, an operating system, a web browser and associated API, other software, etc.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements associated with the system 100 and any other device described herein, may store information into and/or retrieve information from various data stores (e.g., a data storage device such as shared database 190), which may be locally stored or reside remote from other elements. Although a single messaging client 102 and load balancing component 104 are shown in FIG. 1, any number of such devices may be included in the system 100. Moreover, various devices described herein might be combined according to embodiments of the present invention. The system 100 functions may be performed by a constellation of networked apparatuses, such as in a distributed processing or cloud-based architecture.

An operator or administrator may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define broker rules or mapping) and/or provide or receive automatically generated recommendations, alerts, and/or results from the system 100.

Figure 2:
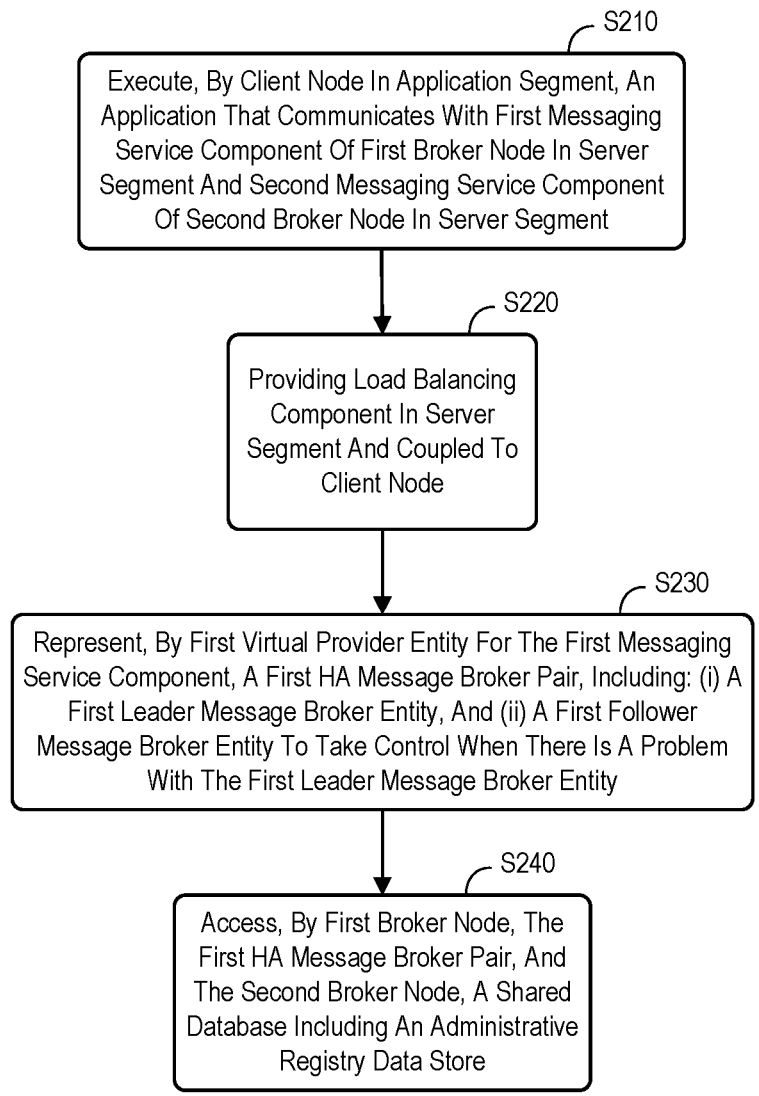
FIG. 2 is a method according to some embodiments.

FIG. 2 is a method that might performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a client node in an application segment may execute an application that communicates with a first messaging service component of a first broker node in a server segment and a second messaging service component of a second broker node in the server segment. The client node may be associated with a multi-tenant HA computing environment, such as a cloud computing environment, an on-premises computing environment, an integration system, a workflow, application, a mobile end point, etc. Moreover, the multi-tenant HA computing environment may be associated with multiple clusters, multiple groups, multiple customers, etc.

At S220, the system may provide a load balancing component in a server segment and coupled to the client node. At S230, a first virtual provider entity for the first messaging service component may represent a first HA message broker pair, including: (i) a first leader message broker entity, and (ii) a first follower message broker entity to take control when there is a problem with the first leader message broker entity. At S240, the first broker node, the first HA message broker pair, and the second broker node, may access a shared database, including an administration registry data store.

Figure 3:
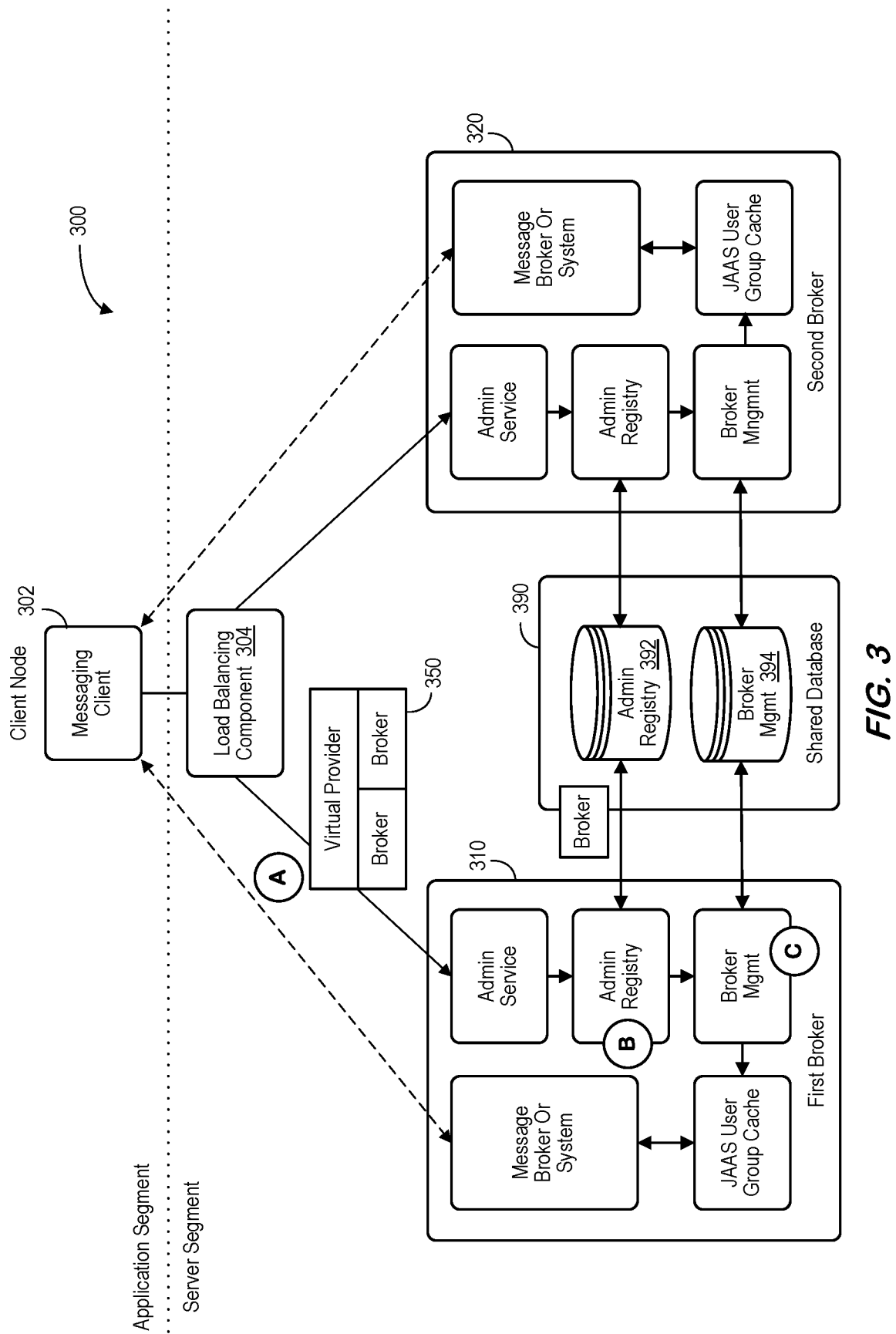
FIG. 3 is a base foundation system for a collaborative load balancing solution in accordance with some embodiments.

Thus, embodiments may provide scalability via a base system definition with a multi-tenant HA broker pair (virtual provider→physical broker decoupling). For example, FIG. 3 is a base foundation system 300 for a collaborative load balancing solution in accordance with some embodiments. As before, the system 300 may provide load balancing for an HA messaging system in a multi-tenant HA computing environment. A client node 302 in an application segment may execute an application (e.g., a messaging client) that communicates with a first message broker or system component (e.g., Active Message Queue ("ActiveMQ")) of a first broker node 310 and a second message broker or system component of a second broker node 320 in a server segment.

Note that ActiveMQ only serves as one example herein for any arbitrary message broker or system. The application and server segments are separate in FIG. 3 to illustrate that the messaging service may part of a general cloud or service provider offering, while the applications are customer specific.

As used herein, the phrase "messaging administration service" may refer to a central component for monitoring and operations of a messaging system. It may take care of integration into an environment like cloud infrastructure (e.g., metering), monitoring, and alerting. Each data center and/or landscape may have a HA message broker pair with a leader and a follower. For example, a load balancing component 304 may coupled to the client node 302, and a first virtual provider entity 350 for the first messaging service component is coupled to the load balancing component 304. As used herein, the phrase "virtual provider" may refer to a logical representation of a physically available message broker that allows to support multi-tenant style configurations. Each virtual provider may be highly isolated, each with its own persistence, security, and runtime constraints configuration. On the level of a virtual provider, embodiments may allow for secure protocols, tune how message delivery works, and/or to delete the complete persistence state. Note that at (A) the first virtual provider entity 350 may represent a first HA message broker pair, including: (i) a first leader message broker entity, and (ii) a first follower message broker entity to take control when there is a problem with the first leader message broker entity. In this way, message consumers and producers may use a messaging client library to register with one of the brokers and fail over to the other broker instance (in case of failure of the current leader).

The messaging client 302 may have access to application-specific communication mechanisms, such as a node manager similar to a control instance (like container composition) of a number of worker nodes (i.e., doing the actual processing and running the application) that can be seen as separate compute resources like containers. According to some embodiments, a WN can only communicate with other WNs of the same cluster via a special multi-tenant node manager, called a Tenant Node Cluster ("TNC").

During subscription, the client may request a handle to the virtual provider 350, or creates one, if none exists at (B) and (C), via a messaging administration service. Note that the administration service may communicate with broker management via an administration registry. The virtual provider 350 contains the concrete broker endpoint (pair) information. Additionally, messaging broker resources may be created via a Representational State Transfer ("REST") Application Programming Interface ("API") (e.g., authorization objects). A shared database 390 is accessible by the first broker node 310, the first HA message broker pair, and the second broker node 320, and includes an administration registry data store 392 and a broker management data store 394. Administration information, such as virtual provider 350 to physical broker assignments, may be stored in the shared database 390 and can be accessed by both paired brokers (via limited means of communication and/or coordination). An authentical or identity provider (e.g., Java Authentication and Authorization Service ("JAAS")) user group cache between Active MQ and broker management denotes an abstraction that deals with user management and/or privileges.

In this way, a base system 300 may provide a foundation for a Collaborative Load Balancing Solution ("CLBS"). As shown in FIG. 3, the client-broker registration uses virtual providers 350 to represent actual HA broker pairs. Instead of an assignment of client-to-brokers via a broker-to-broker communication and/or network, the messaging clients may be involved in a Client-Side Load Balancing ("CSLB") approach. Note that CSLB may distribute the load from one broker pair to another, providing configurable balancing over multiple HA broker service pairs. In the context of CSLB, the scalability options and broker selection mechanisms may be important for the extension of base system 300. According to some embodiments, for CSLB another HA broker pair may be deployed. The database between the existing and new broker pairs remains the same (the shared database 390). Therefore, the broker's management tables could remain the same (no new schema and namespace required). This means that the caches will show more authorizations than required. This might also lead to longer load times and more memory required for the caches. To avoid this, the broker pairs might be separated as will be explained.

Figure 4:
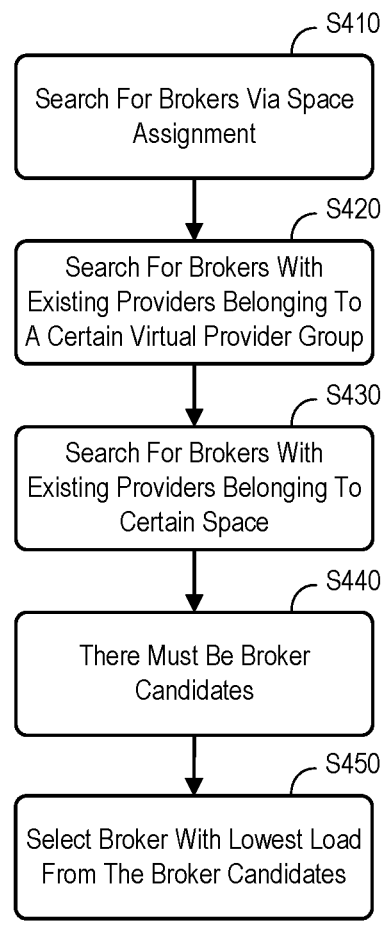
FIG. 4 is a client-side load balancing method according to some embodiments.

FIG. 4 is a CSLB method for a single HA broker pair virtual provider selection mechanism according to some embodiments. At S410, the system may search for brokers via space assignment (e.g., based on broker attributes). At S420, the system may search for brokers with existing providers belonging to a certain virtual provider group. Note that a virtual provider with a group assignment should be mapped to same cluster. If found, the system can filter brokers by cluster. If not found, no filter may be performed (it can be assigned to all clusters, brokers). At S430, the system may search for brokers with existing providers belonging to a certain space to limit distribution of virtual providers (note that there must be broker candidates at S440). At S450, the system may select the broker with the lowest load from the broker candidates (space:=account). The account may, for example, be a billable unit used by a tenant=user=clustomer.

CSLB offers several options on how to balance the load over additional HA broker pairs. Briefly, the load can be balanced distributed (i.e., by the clients) or centralized (i.e., by the server).

One variant of CSLB is Client-CSLB ("C-CSLB") where the client node decides broker selection (e.g., by configuration or decision based on the current load situation). The C-CSLB variant allows for fine granular load balancing, letting the client decide the broker it wants to use. Therefore, additional information from the broker or the platform might be required. Rules would have to be enforced such that tenants within one cluster would not use different brokers. Furthermore, changes to the re-implemented control logic may result in client updates.

Another variant of CSLB is Server-CSLB ("S-CSLB") where the server node decides assignments. The S-CSLB variant allows for central load balancing with a single point of configuration, which may require less development effort as compared to other options. However, a differentiation on the account level may be required (which can ultimately mean substantially higher operations costs for the additional provider account maintenance).

Still another variant of CSLB is Hybrid-CSLB ("H-CSLB") where the client and server collaborate to find a suitable assignment. The H-CSLB variant allows for fine granular load balancing using decision selection information, such as the messaging system's group information, that is injected via the system's cluster system settings on the client level. Existing and/or legacy systems may have to follow the operations rule "new clusters must get a new service group setting ("pinning existing": none of the existing clusters shall get it, however, the setting must be persistent even after cluster updates)." This approach requires no further operational effort and no client update, because the mechanism is already in place. However, the group assignment must be set automatically as a system property on the cluster controller level (to avoid manual configuration effort and misconfiguration).

Figure 5:
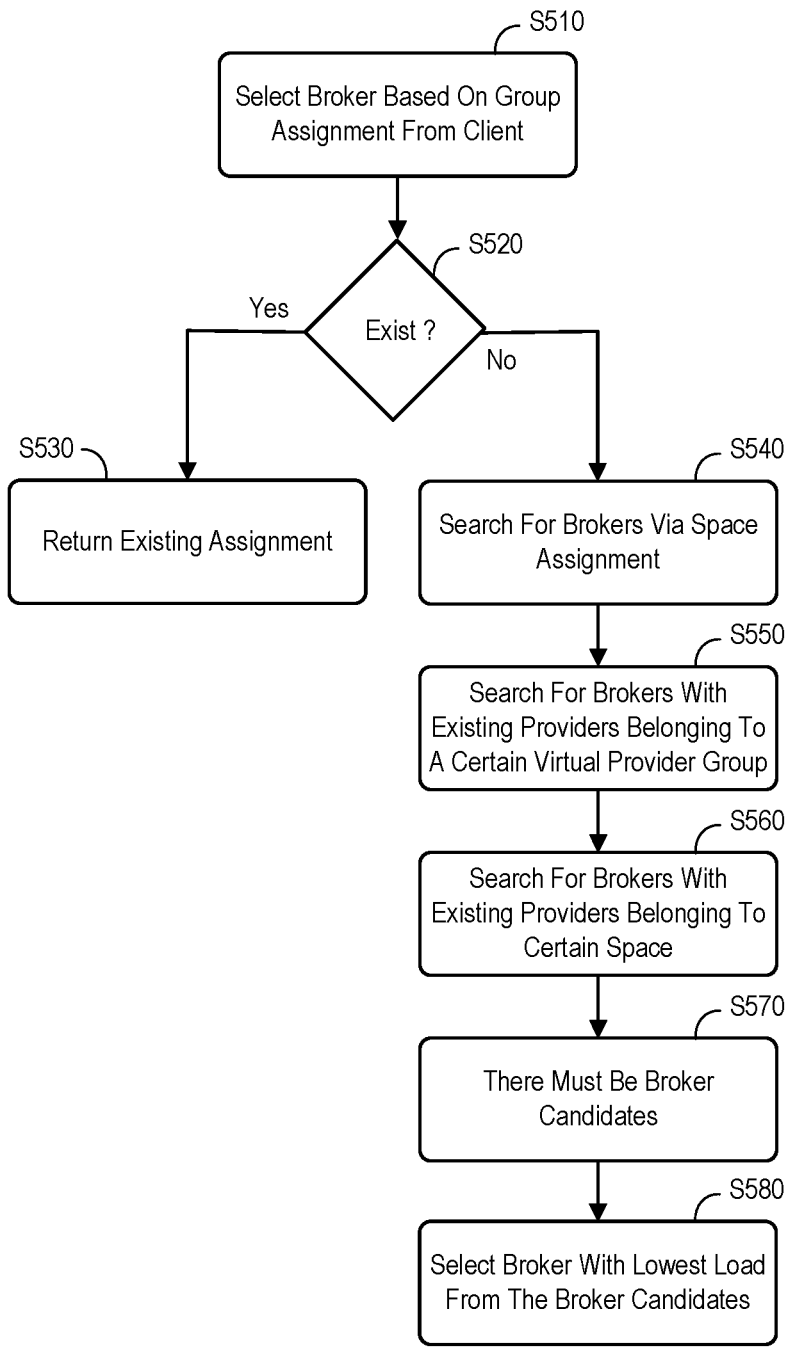
FIG. 5 is a hybrid client-side load balancing method in accordance with some embodiments.

A characteristic for H-CSLB may comprise a provider selection decision based on the client input in the form of a messaging system's "group" setting (hence "hybrid"). Thereby, the client gets a group setting from the system properties on a cluster level. Consequently, clients use a unique identifier (e.g., a Globally Unique Identifier ("GUID") or account and cluster) as group information. The base mechanism may be extended by adding S410 as illustrated in FIG. 5 which shows a H-CSLB method in accordance with some embodiments. At S510, the broker is selected based on the group assignment at S530 and returned if an assignment was found at S520. If no group assignment exists at S520, the system continues with current mechanism, i.e., the broker selection based on the space assignment at S540. At S550, the system may search for brokers with existing providers that belong to a certain virtual provider group. Note that a virtual provider with a group assignment should be mapped to same cluster. If found, the system will filter brokers by cluster. If not found, not filter is applied (it can be assigned to all clusters and brokers). At S560, the system search for brokers with existing providers belonging to a certain space limits distribution of virtual providers (note that there must be broker candidates at S570). At S580, the system may select the broker with lowest load from the broker candidates. Note that during the first selection with a group, the group does not yet exist at S520 and steps S540 through S580 are executed. The group information is written when a virtual provider assignment is created. Then, the next selection with the same group will match at S520 and returns with the group.

Figure 6:
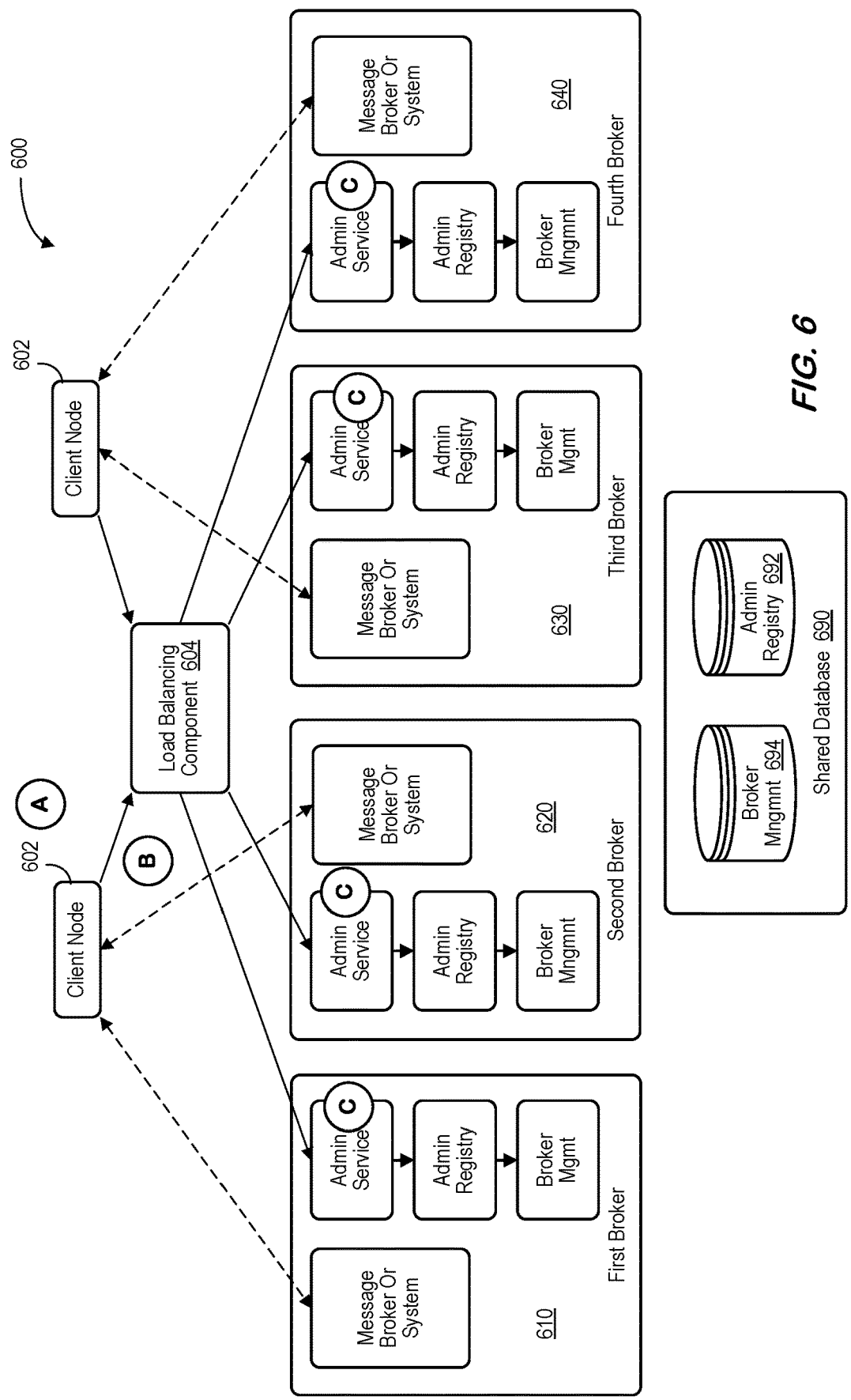
FIG. 6 is a hybrid client-side scaling and load balancing solution according to some embodiments.

FIG. 6 is a hybrid client-side scaling and load balancing solution 600 according to some embodiments. As before, client nodes 602 access a load balancing component 604 and message broker or system components associated with brokers 610, 620, 630, 640. As depicted in FIG. 6, the clusters are started with the messaging system's group as system property at (A). The system properties are delegated to the administration service of each broker 610, 620, 630, 640, where a virtual provider is selected according to the extended virtual broker mechanism at (B). In this way, the administration service at (C) may decide on a selected broker. A shared database 690 contains an administration registry data store 692 and broker management data store 694 similar to the corresponding elements described with respect to FIG. 3.

Figure 7:
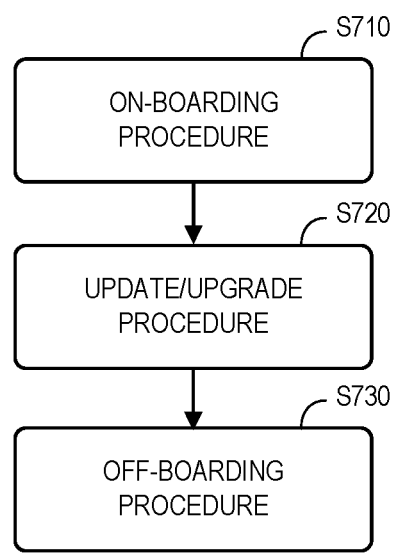
FIG. 7 is a hybrid client-side load balancing operating method in accordance with some embodiments.

FIG. 7 is a hybrid client-side load balancing operating method in accordance with some embodiments. For the H-CSLB mechanism to work in accordance with this embodiment, "new clusters must get a new messaging system's group setting, while pinning the existing tenants to the old broker." Note that this rule may be more complex as compared to the one for S-CSLB and denotes a continuous operations effort, if not automatically set on the cluster level. Manual effort may be avoided for several reasons. With respect to a "group assignment problem," the system may avoid mixed group assignments within one cluster and thus the group setting may be set and preserved during the lifecycle of a node.

At S710, an on-boarding procedure may involve an on-boarding script that adds the system property "messaging.admin.client.group" in the on-boarding script. The value may be set to a unique identifier on cluster level, such as provider account identifier and cluster identifier (or maybe a GUID, if necessary). A "tenant node controller" may be associated with essentially a cluster controller with zero to many tenant node controllers (specific to a tenant/customer→multi-tenancy) and a tenant node controller has zero to many worker nodes that do the actual processing (e.g., application logic). The cluster controller may help manage the tenants and the tenant node controller may help manage the workers of that tenant. In a tenant node controller layer, the system may propagate the property to all nodes of the cluster controller, e.g., through white-listing. At S720, in an update/upgrade procedure the system may determine the group setting from the virtual provider within the service client library. This may have the disadvantage of requiring a message broker client update. The logic in the service client is therefore extended, which checks whether there is a "not null" and "non empty" group property and sets it as system property. At S730, an off-boarding procedure may delete the virtual provider of off-boarded node using the message broker PI, which should delete all dependent service objects. Note that the migration of tenants from one cluster to another is a not documented operations service that is used frequently.

Therefore, the cluster should set a group system property during on-boarding S710, the group assignment has to be ensured during update/upgrade at S720 and the message broker resources have to be free during off-boarding at S730. A migration of a tenant from one cluster to another will then result in the creation of a new virtual provider and a re-assignment to a new group. This leaves a consistent group assignment within one cluster. The manual effort of this procedure should be less time consuming than the continuous manual task required for variant S-CSLB.

Figure 8:
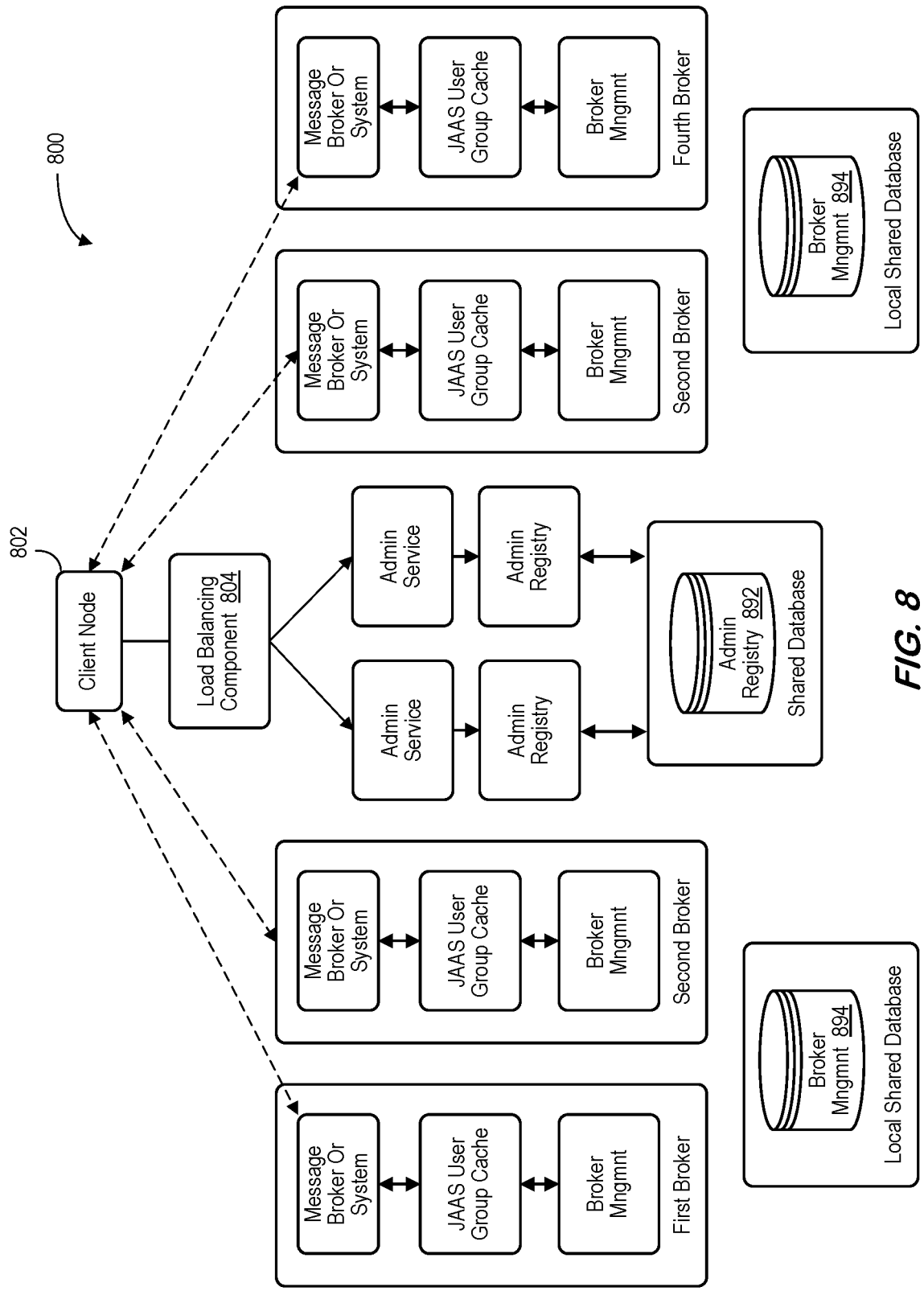
FIG. 8 is a system to improve a shared database bottleneck according to some embodiments.

Note that H-CSLB scales HA broker pairs well but is still limited to the coordination through a single shared database (e.g., a bottleneck). To avoid this, some embodiments may separate the administration and broker management databases. This removes the shared database as a single point of failure in a multi-HA-pair setup with client-side load balancing. FIG. 8 is a system 800 to improve a shared database bottleneck according to some embodiments. As before, a client node 802 communities with a load balancing component 804 and message broker or system components of various brokers. The load balancing component 804 communicates with administration services to access an administration registry data store 892 in a shared database via an administration registry. In this embodiment, however, different brokers access different broker management data stores 894 in local shared databases, thus avoiding the bottleneck.

Figure 9:
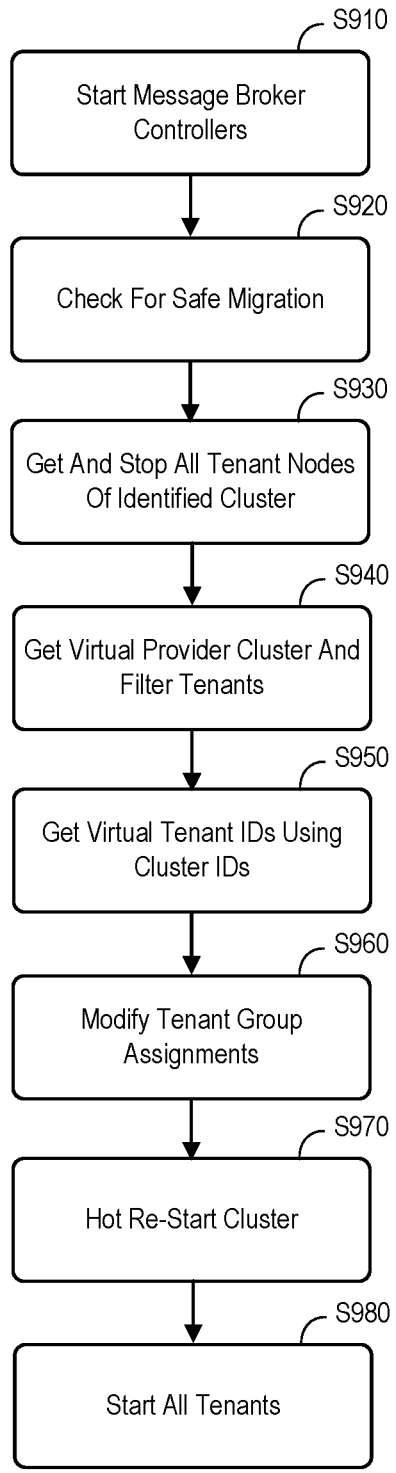
FIG. 9 is a safe migration method in accordance with some embodiments.

According to some embodiments, a migration process may be performed. For example, for the migration of already existing and/or legacy HA cluster pairs to scalable HA cluster pairs, a "safe" migration is considered a migration that does not migrate currently productively used and/or running clusters. Productive, but idle clusters are referred to as "safe" clusters. FIG. 9 is a safe migration method in accordance with some embodiments. At S910, cluster controllers as well as a service controller (or, in general, message broker controllers are started). At S920, a subsequent check ensures that the migration is safe (can be overwritten by setting -unsafe=true). At S930, the system may get and stop all tenant nodes (cluster of worker nodes) of the identified cluster=cluster controller. At S940, the system may get a virtual provider cluster=cluster controller identifiers (and filter tenants). At S950, the system may get virtual provider tenant identifiers using the cluster identifiers. At S960, the system may modify the tenants' group assignments (e.g., delete and create a virtual provider with a new group assignment and updated broker URL). At S970, a hot restart may be performed of the cluster=cluster controller (e.g., "hot" meaning without downtime). At S980, the system may then start all of the tenants.

Figure 10:
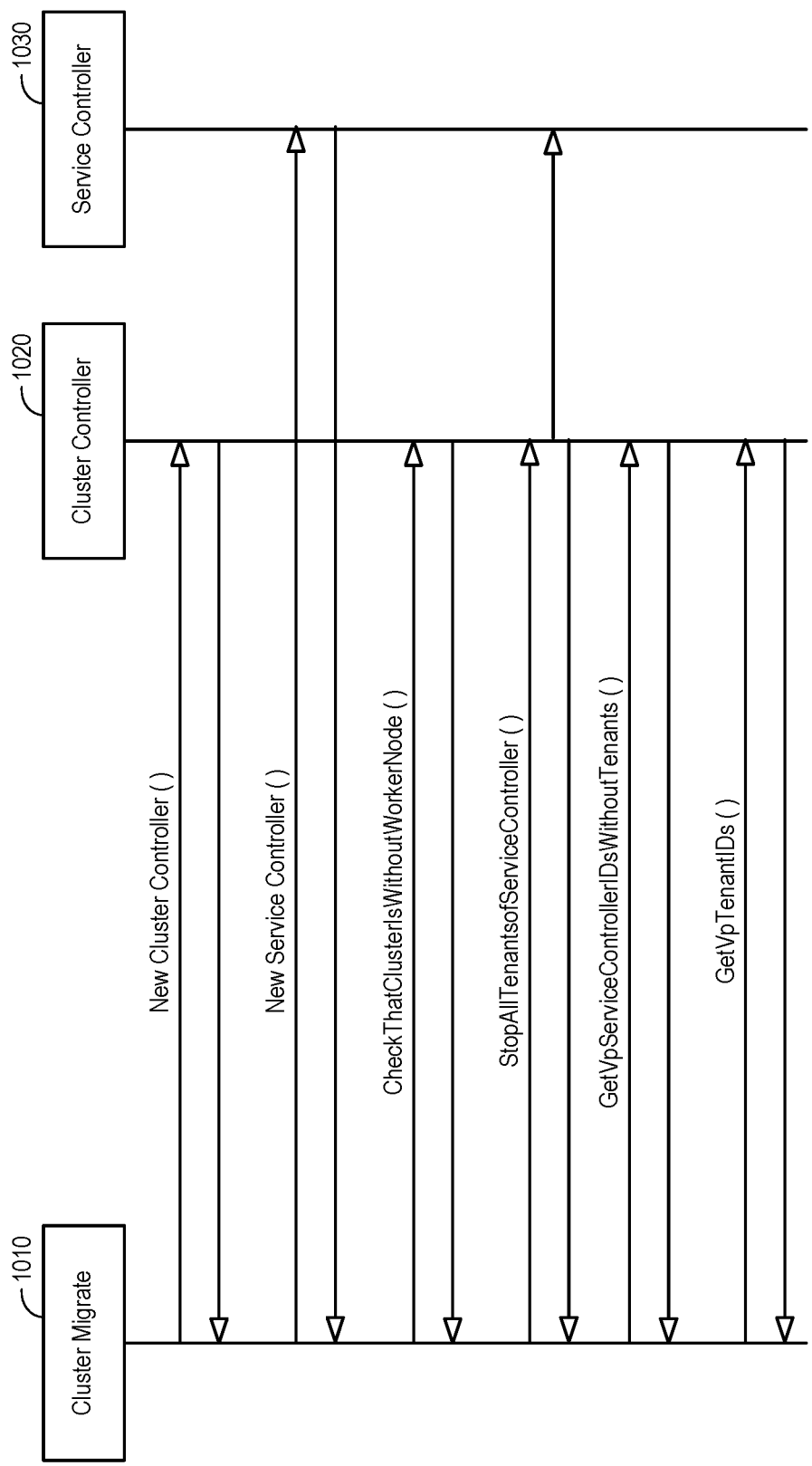
FIG. 10 is an information flow diagram according to some embodiments.

FIG. 10 is an information flow diagram for a migration program (depicting only a "safe" migration) according to some embodiments. A cluster migrate element 1010 transmits a new cluster controller to a cluster controller 1020. The cluster migrate element 1010 then sends a new service controller to service controller 1030. Next, the cluster migrate element 1010 checks that the cluster is without a worker node via the cluster controller 1020. Subsequently, the cluster migrate element 1010 stops all tenants of the cluster controller via the cluster controller 1020 (which triggers an access of the service controller 1030). The cluster migrate element 1010 then gets the virtual provider identifiers without tenants via the cluster controller 1020.

Figure 11:
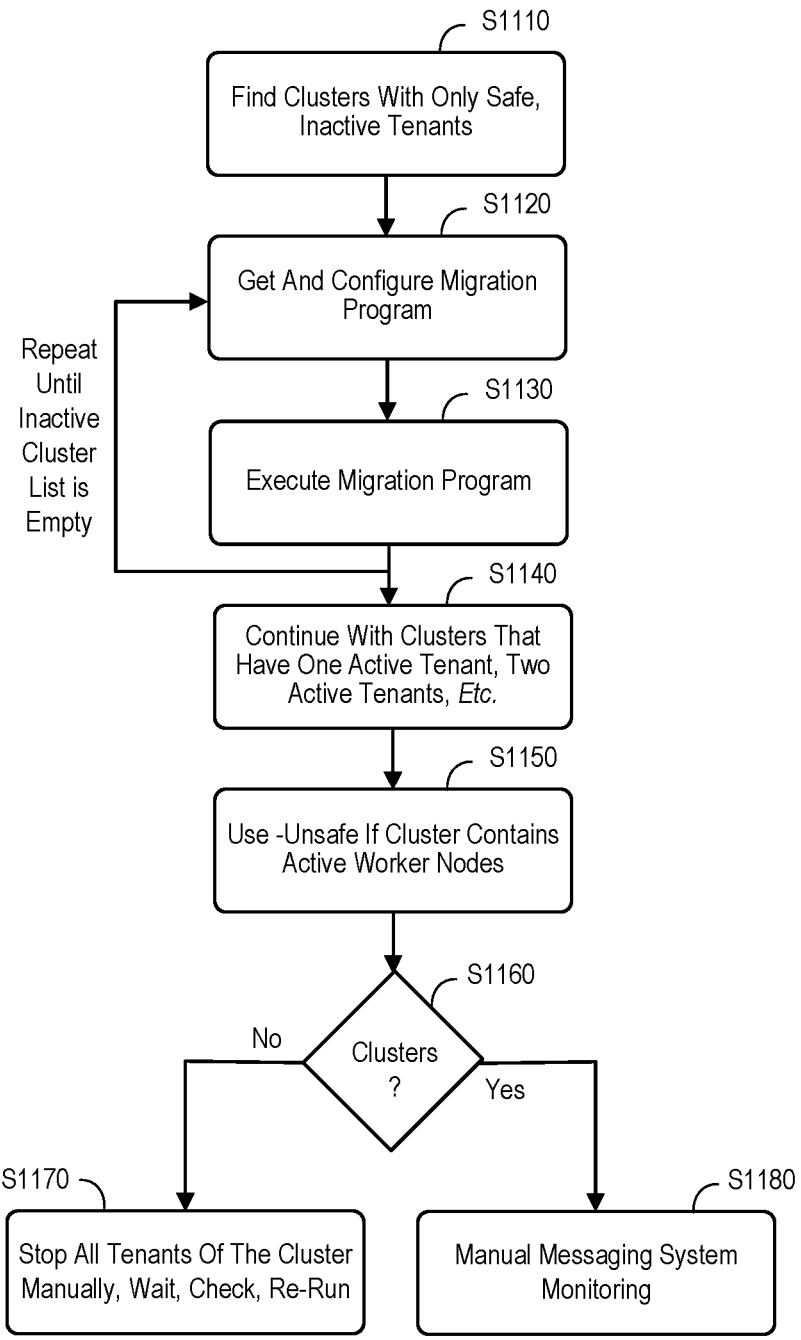
FIG. 11 is a central cluster identify re-writing and troubleshooting method in accordance with some embodiments.

FIG. 11 is a central cluster identify re-writing and troubleshooting method in accordance with some embodiments. At S1110, the system may find clusters with "safe" inactive tenants exclusively. At S1120, the system may get and configure a migration program (e.g., as described with respect to FIGS. 9 and 10). At S1130, the system may execute the migration program. This might involve, for example, starting with the following parameters: cluster URL, cluster USER and broker password [-unsafe]. Execution may also involve checking the assignment and/or connection count in monitors. Steps S1120 and S1130 may be repeated until the inactive tenant cluster list is empty. The system can then continue with clusters that have only one active tenant, etc. at S1140. With respect to troubleshooting, a semi-automated process may, at 51150 use -unsafe (if the cluster contains active worker nodes), otherwise -unsafe=false. If clusters don't come up at S1160, the system may stop all tenants of the cluster manually, wait for all tenants to be stopped, and then check that associated applications and/or clients in the account cockpit are stopped at S1170. The system can then rerun the migration tool for this cluster again (if on-boarded, but stopped tenants come up then the system should stop using them e.g., subscriptions could be missing). If clusters do come up at S1160, then a manual messaging system monitoring workflow as will now be described.

Figure 12:
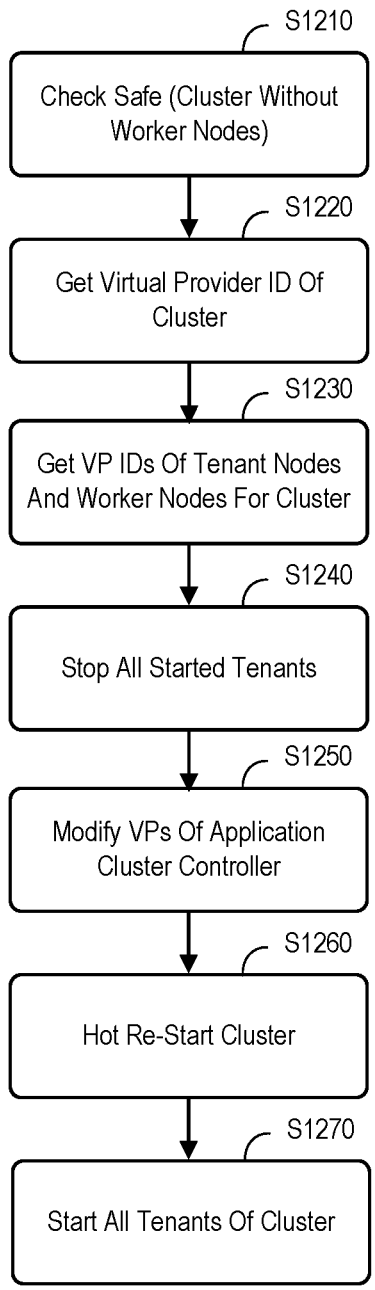
FIG. 12 is a manual workflow for an un-safe troubleshooting method in accordance with some embodiments.

FIG. 12 is a manual workflow for an un-safe troubleshooting method in accordance with some embodiments. For all clusters to be migrated (same as migration program, but manual execution), the system check that the cluster is safe at S1210 (that is, it is a without working nodes. According to some embodiments, this determination can be overruled. At S1220, the system may obtain the virtual provider identifier of the cluster and get the virtual provider identifier of tenant nodes and worker nodes for the cluster at S1230. At 51240, the system may stop all started tenants (tenant nodes and worker nodes) and modify virtual providers of the application cluster controller and all onboarded tenant nodes and worker nodes at S1250. At S1260, a hot restart of the cluster may be performed and all tenants of the cluster (tenant nodes and worker nodes) may be started at S1270. This may require: (i) cluster access and NM commands, and (ii) broker access and broker APIs.

Figure 13:
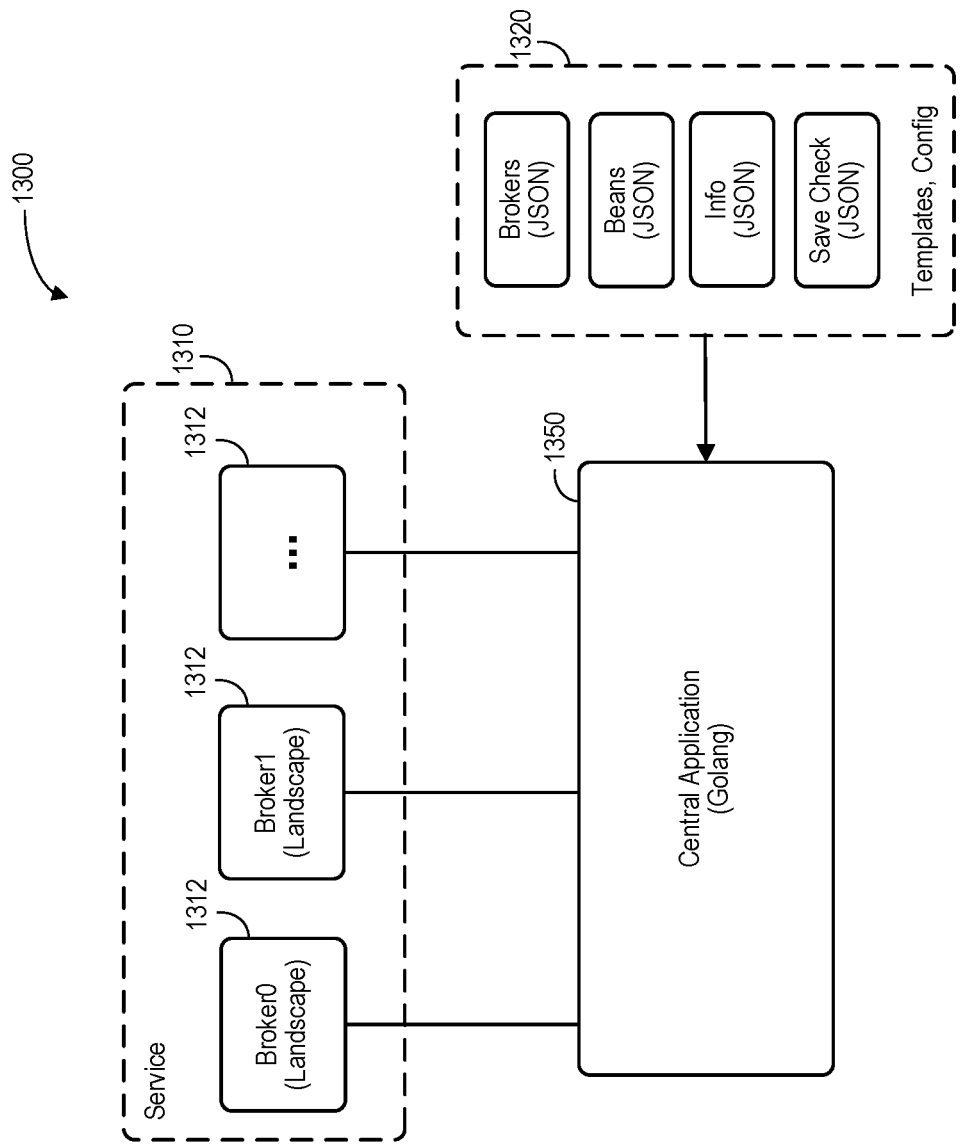
FIG. 13 is a messaging system monitoring architecture according to some embodiments.

FIG. 13 is a messaging system monitoring architecture 1300 according to some embodiments. A central application 1350 may be associated with brokers 1312 in service 1310.

Moreover, various JSON components in a templates and configuration data store 1320 may be accessed by the central application. According to some embodiments, data is provided by the messaging system brokers (e.g., in form of Java Mbeans), which are queried by the central application 1350 (e.g., Jolograph). The system may transform received data into, for example, Graphite line format and store it (e.g., into a time series database) for monitoring and alerting purposes. In some embodiments, queries are pre-defined and/or configured in the form of the info.json, slavecheck.json and beans.json files that are sent as the body of a query. If the interface changes or new metrics are added, only those configuration files will need to be adapted while the central application code (e.g., Jolograph) remains unchanged. To connect to the brokers and keep the Jolograph code generic, the list of brokers may be provided by a brokers.json configuration (which needs to be updated when on-boarding a new data center).

Thus, embodiment may provide improved broker networks and avoid problems associated with a gossiping protocol approach (which still requires coordination between the message brokers, consumes network bandwidth, only supports eventual consistency and have high latency—that is, broker selection takes a substantial amount of time because messages are exchanged randomly between neighbors).

Figure 14:
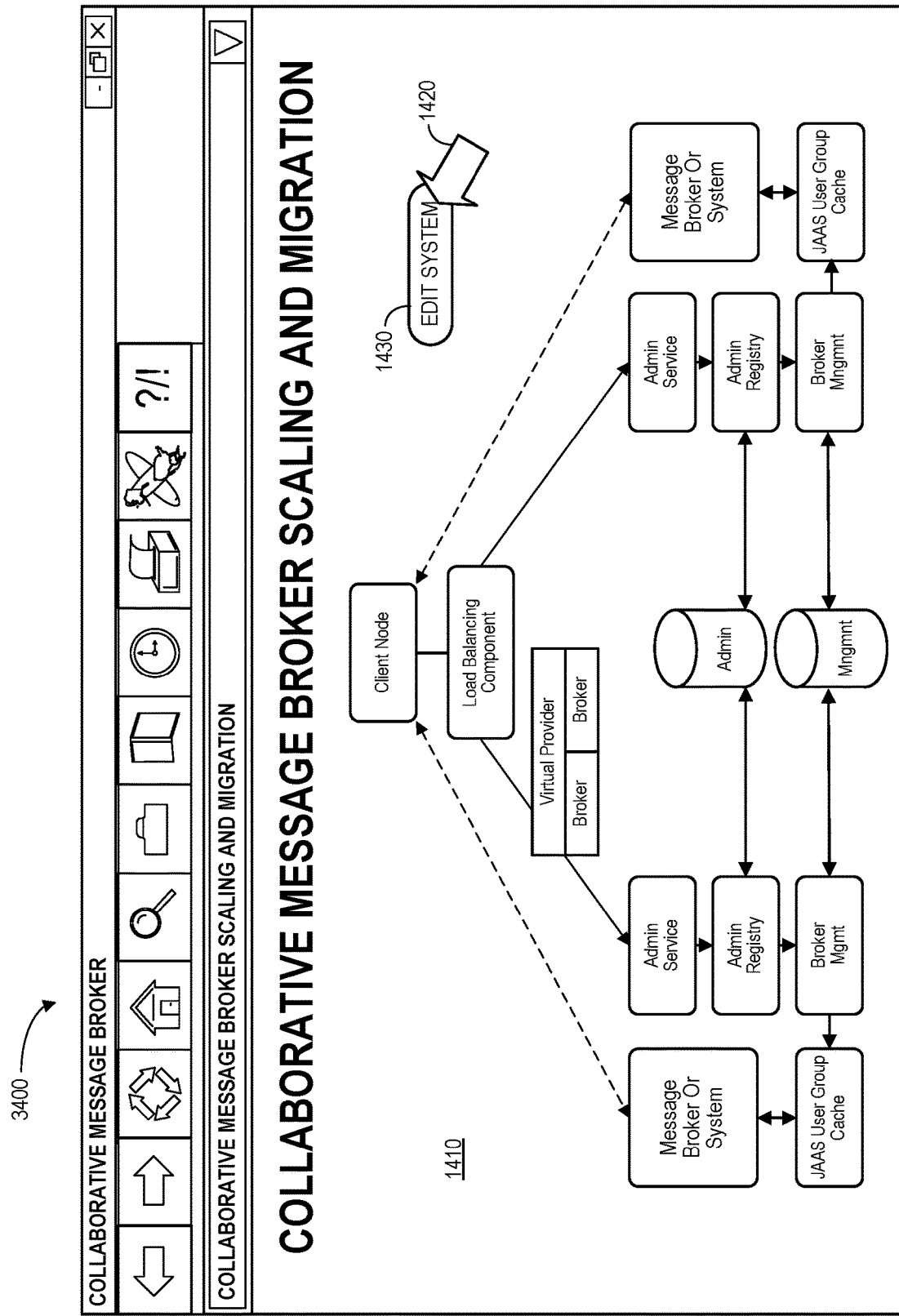
FIG. 14 is a human machine interface display according to some embodiments.

FIG. 14 is a human machine interface display 1400 in accordance with some embodiments. The display 1400 includes a graphical representation 1410 of a collaborative message broker scaling and migration system in accordance with any of the embodiments described herein. Selection of an element on the display 1400 (e.g., via a touchscreen or a computer pointer 1420) may result in display of a pop-up window containing more detailed information about that element and/or various options (e.g., to add or adjust new shared databases, map messaging protocols, adjust load balancing parameters, etc.). Selection of an "Edit System" icon 1430 may also let an operator or administrator initiate or finalize operation of the collaborative message broker system system.

Figure 15:
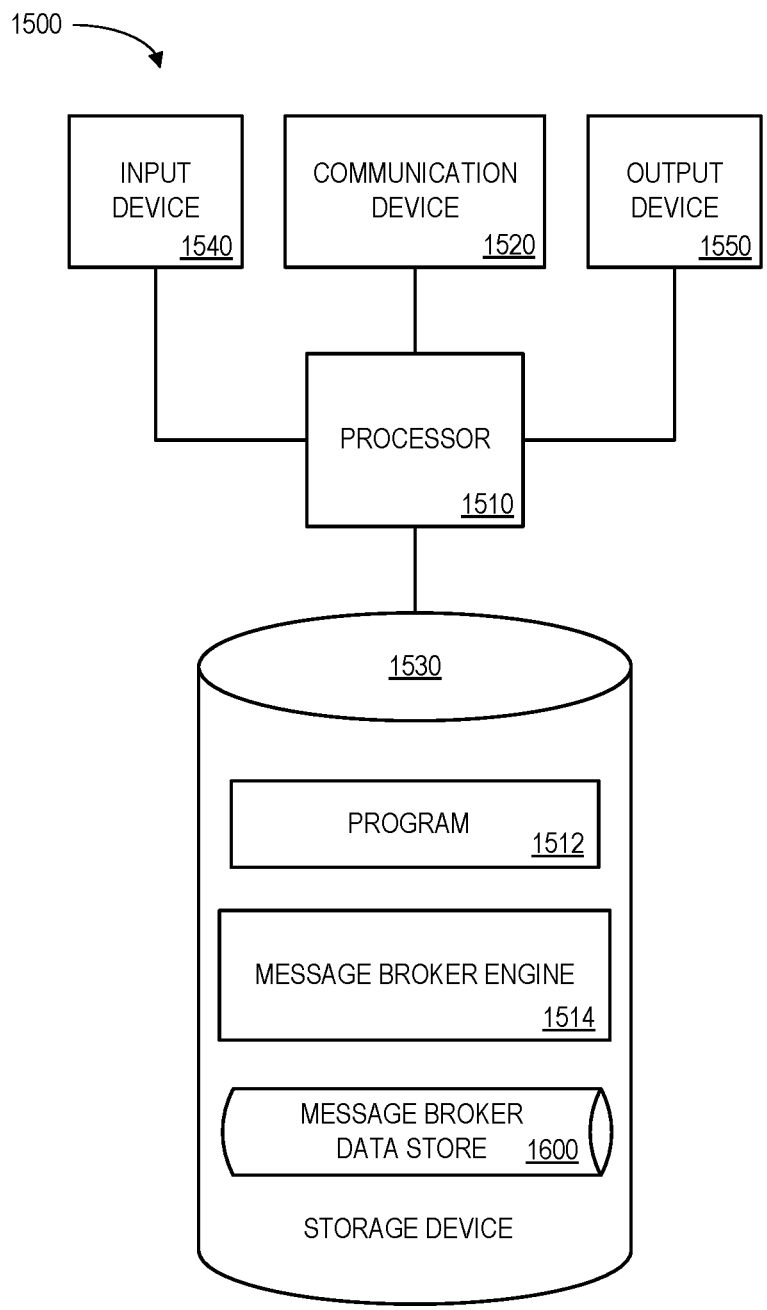
FIG. 15 is an apparatus or platform according to some embodiments.

Note that the embodiments described herein may be implemented using any number of different hardware configurations. For example, FIG. 15 is a block diagram of an apparatus or platform 1500 that may be, for example, associated with the system 200 of FIG. 2 (and/or any other system described herein). The platform 1500 comprises a processor 1510, such as one or more commercially available Central Processing Units ("CPUs") in the form of one-chip microprocessors, coupled to a communication device 1520 configured to communicate via a communication network (not shown in FIG. 15). The communication device 1520 may be used to communicate, for example, with one or more remote designer platforms, administrator platforms, etc. The platform 1500 further includes an input device 1540 (e.g., a computer mouse and/or keyboard to input formalization and optimization information) and/an output device 1550 (e.g., a computer monitor to render a display, transmit optimization recommendations, and/or create reports about application integration, benchmark results, etc.). According to some embodiments, a mobile device, monitoring physical system, and/or PC may be used to exchange information with the platform 1500.

The processor 1510 also communicates with a storage device 1530. The storage device 1530 may comprise any appropriate information storage device, including combinations of magnetic storage devices (e.g., a hard disk drive), optical storage devices, mobile telephones, and/or semiconductor memory devices. The storage device 1530 stores a program 1512 and/or a message broker engine 1514 for controlling the processor 1510. The processor 1510 performs instructions of the programs 1512, 1514, and thereby operates in accordance with any of the embodiments described herein. For example, the processor 1510 might provide load balancing for an HA messaging system in a multi-tenant HA computing environment.

The programs 1512, 1514 may be stored in a compressed, uncompiled and/or encrypted format. The programs 1512, 1514 may furthermore include other program elements, such as an operating system, clipboard application, a database management system, and/or device drivers used by the processor 1510 to interface with peripheral devices.

As used herein, information may be "received" by or "transmitted" to, for example: (i) the platform 1500 from another device; or (ii) a software application or module within the platform 1500 from another software application, module, or any other source.

In some embodiments (such as the one shown in FIG. 15), the storage device 1530 further stores a message broker data store 1600. An example of a database that may be used in connection with the platform 1500 will now be described in detail with respect to FIG. 16. Note that the database described herein is only one example, and additional and/or different information may be stored therein. Moreover, various databases might be split or combined in accordance with any of the embodiments described herein.

Figure 16:
FIG. 16 is portion of a collaborative message broker data store in accordance with some embodiments.

Referring to FIG. 16, a table is shown that represents the message broker data store 1600 that may be stored at the platform 1500 according to some embodiments. The table may include, for example, entries associated with collaborative message brokers. The table may also define fields 1602, 1604, 1606, 1608, 1610 for each of the entries. The fields 1602, 1604, 1606, 1608, 1610 may, according to some embodiments, specify: a message broker identifier 1602, a type 1604, a virtual provider identifier 1606, a client node identifier 1608, and a status 1610. The message broker data store 1600 might be created and updated, for example, when designer creates a new system, load balancing is performed, there is a problem with a leader message broker, etc.

The message broker identifier 1602 might be a unique alphanumeric label that is associated with a message broker of a collaborative scaling and migration system. The type 1604 might indicate that the broker is a follower or a leader. The virtual provider identifier 1606 might comprise a logical representation of a physically available message broker to support multi-tenant configuration. The client node identifiers 1608 might be associated with a messaging client in an application segment that communicates with a messaging service component (e.g., ActiveMQ or other message system). The status 1610 might indicate that the message broker is active, following, experiencing a problem, etc.

Thus, embodiments may provide a messaging service for monitoring and coordination between the nodes of broker pair along with a novel collaborative scaling and/or load balancing mechanism between the messaging administration service and the clients (e.g., H-CSLB). A mechanism may apply H-CSLB to existing and/or legacy systems and new HA broker pairs and offboarding (providing elastic scaling). Embodiments may also support a novel shared and local data store architecture to reduce database bottlenecks. A migration procedure and program for "safe" automated migration and manual "unsafe" migration or troubleshooting may also be provided according to some embodiments along with configurable broker monitoring and alerting.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 17:
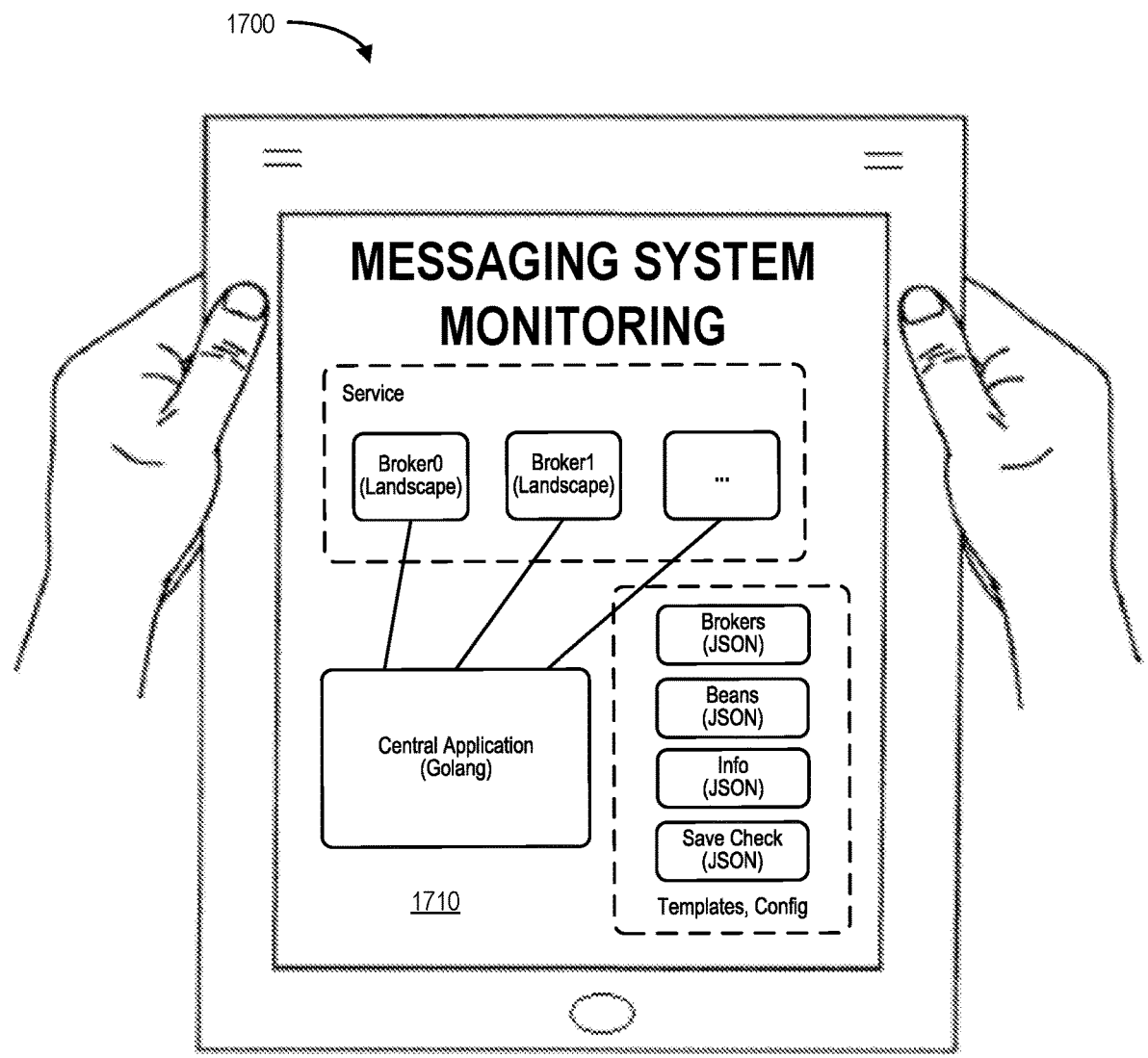
FIG. 17 is a tablet computer providing a collaborative message broker display according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of application integrations and microservices, any of the embodiments described herein could be applied to other types of applications. Moreover, the displays shown herein are provided only as examples, and any other type of user interface could be implemented. For example, FIG. 17 illustrates a tablet computer 3700 with a messaging system monitoring display 1710. The display 1710 might be used, for example, by an operator or administration to configure monitoring of a messaging system (e.g., by modifying parameters for a supervisor, local host, JSON files, etc.).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to provide load balancing for a messaging system in a multi-tenant High Availability ("HA") computing environment, comprising:
    a client node, in an application segment, executing an application that communicates with a first messaging service component of a first broker node in a server segment and a second messaging service component of a second broker node in the server segment;
    a load balancing component in the server segment and coupled to the client node;
    a first virtual provider entity for the first messaging service component, in the server segment and coupled to the load balancing component, the first virtual provider entity representing a first HA message broker pair, the first pair including:
        a first leader message broker entity, and
        a first follower message broker entity to take control when there is a problem with the first leader message broker entity; and
    a shared database accessible by the first broker node, the first HA message broker pair, the second broker node, a second HA message broker pair, a third broker node, and a fourth broker node, including:
        an administration registry data store,
    wherein the first broker node accesses the administration registry data store via an administration registry component that also communicates with the first virtual provider via an administration service, the first and second broker nodes communicate with one local broker management data store, and the third and fourth broker nodes communicate with another local broker management data store.

2. The system of claim 1, wherein the first messaging service component of the first broker node communicates with a broker management component via an authentication or identity provider user group cache to provide user management and privileges.

3. The system of claim 2, wherein the authentication or identity provider user group cache comprises a Java Authentication and Authorization Service ("JAAS") user group cache.

4. The system of claim 1, wherein client-side load balancing is performed by the client node to determine broker selection.

5. The system of claim 1, wherein client-side load balancing is performed by the server segment to determine broker selection.

6. The system of claim 1, wherein hybrid client-side load balancing is performed by the client node collaborating with the server segment to determine broker selection.

7. The system of claim 6, wherein said collaborating includes an injection of messaging system decision selection information via system cluster settings on a client level.

8. The system of claim 7, wherein the decision selection information comprises group information.

9. The system of claim 1, wherein the multi-tenant HA computing environment is associated with at least one of: (i) a cloud computing environment, (ii) an on-premises computing environment, (iii) an integration system, (iv) a workflow, (v) application, and (vi) a mobile end point.

10. The system of claim 1, wherein the multi-tenant HA computing environment is associated with at least one of: (i) multiple clusters, (ii) multiple groups, and (iii) multiple customers.

11. The system of claim 1, further comprising:
a second virtual provider entity for the second messaging service component, in the server segment and coupled to the load balancing component, the second virtual provider entity representing a second HA message broker pair, the second pair including:
a second leader message broker entity, and
a second follower message broker entity to take control when there is a problem with the second leader message broker entity;
a third messaging service component of a third broker node in the server segment; and
a fourth messaging service component of a fourth broker node in the server segment.

12. A computer-implemented method to provide load balancing for a messaging system in a multi-tenant High Availability ("HA") computing environment, comprising:
executing, by a client node in an application segment, an application that communicates with a first messaging service component of a first broker node in a server segment and a second messaging service component of a second broker node in the server segment;
providing a load balancing component in the server segment and coupled to the client node;
representing, by a first virtual provider entity for the first messaging service component, a first HA message broker pair, the first pair including:
a first leader message broker entity, and
a first follower message broker entity to take control when there is a problem with the first leader message broker entity; and
accessing, by the first broker node, the HA first message broker pair, the second broker node, a second HA message broker pair, a third broker node, and a fourth broker node, a shared database, the shared database including:
an administration registry data store,
wherein the first broker node accesses the administration registry data store via an administration registry component that also communicates with the first virtual provider via an administration service, the first and second broker nodes communicate with one local broker management data store, and the third and fourth broker nodes communicate with another local broker management data store.

13. The method of claim 12, wherein the first messaging service component of the first broker node communicates with a broker management component via an authentication or identity provider user group cache to provide user management and privileges.

14. A non-transitory, computer-readable medium storing instructions, that, when executed by a processor, cause the processor to perform a method to provide load balancing for a messaging system in a multi-tenant High Availability ("HA") computing environment, the method comprising:
executing, by a client node in an application segment, an application that communicates with a first messaging service component of a first broker node in a server segment and a second messaging service component of a second broker node in the server segment;
providing a load balancing component in the server segment and coupled to the client node;
representing, by a first virtual provider entity for the first messaging service component, a first HA message broker pair, the first pair including:
a first leader message broker entity, and
a first follower message broker entity to take control when there is a problem with the first leader message broker entity; and
accessing, by the first broker node, the first HA message broker pair, the second broker node, a second HA message broker pair, a third broker node, and a fourth broker node, a shared database, the shared database including:
an administration registry data store,
wherein the first broker node accesses the administration registry data store via an administration registry component that also communicates with the first virtual provider via an administration service, the first and second broker nodes communicate with one local broker management data store, and the third and fourth broker nodes communicate with another local broker management data store.

15. The medium of claim 14, wherein hybrid client-side load balancing is performed by the client node collaborating with the server segment to determine broker selection.

16. The medium of claim 15, wherein said collaborating includes an injection of messaging system group information via system cluster settings on a client level.

* * * * *